(12) United States Patent
Ishii

(10) Patent No.: US 6,786,042 B2
(45) Date of Patent: Sep. 7, 2004

(54) AXLE DRIVING APPARATUS

(76) Inventor: Norihiro Ishii, 2-18-1 Inadera, Amagasaki-shi, Hyogo-ken (JP)

( * ) Notice: Subject to any disclaimer, the term of this patent is extended or adjusted under 35 U.S.C. 154(b) by 0 days.

(21) Appl. No.: 10/454,611

(22) Filed: Jun. 5, 2003

(65) Prior Publication Data

US 2003/0192309 A1 Oct. 16, 2003

Related U.S. Application Data

(63) Continuation of application No. 09/887,251, filed on Jun. 25, 2001, now Pat. No. 6,604,359, which is a continuation of application No. 09/381,231, filed as application No. PCT/IB97/00240 on Mar. 12, 1997, now Pat. No. 6,272,854.

(51) Int. Cl.$^7$ ............................................. F16D 39/00
(52) U.S. Cl. ................................................. 60/487
(58) Field of Search ........................... 60/487; 92/12.2; 47/836; 91/505

(56) References Cited

U.S. PATENT DOCUMENTS

| | | | |
|---|---|---|---|
| 2,354,214 A | | 7/1944 | Lockwood |
| 3,403,582 A | | 10/1968 | Morden |
| 3,528,323 A | | 9/1970 | Kamlukin |
| 3,911,792 A | * | 10/1975 | Heyl et al. .................... 91/505 |
| 4,856,264 A | * | 8/1989 | Nishimura et al. ........... 60/487 |
| 5,090,949 A | | 2/1992 | Thoma et al. |
| 5,142,940 A | | 9/1992 | Hasegawa |
| 5,394,699 A | | 3/1995 | Matsufuji |
| 5,456,068 A | | 10/1995 | Ishii et al. |
| 5,505,279 A | | 4/1996 | Louis et al. |
| 5,544,547 A | | 8/1996 | Ishimaru |
| 5,588,294 A | * | 12/1996 | Sakakura et al. ............. 60/464 |
| 5,622,051 A | | 4/1997 | Iida et al. |
| 5,794,443 A | * | 8/1998 | Shimizu ...................... 60/487 |
| 5,799,486 A | | 9/1998 | Takada et al. |
| 5,819,537 A | | 10/1998 | Okada et al. |
| 5,897,452 A | | 4/1999 | Schreier et al. |
| 5,984,822 A | | 11/1999 | Schreier et al. |
| 6,152,846 A | | 11/2000 | Schreier et al. |

FOREIGN PATENT DOCUMENTS

JP            09177933 A       7/1997

* cited by examiner

*Primary Examiner*—Edward K. Look
*Assistant Examiner*—Igor Kershteyn
(74) *Attorney, Agent, or Firm*—Sterne, Kessler, Goldstein & Fox P.L.L.C.

(57) ABSTRACT

An axle driving apparatus consisting of a housing for compactly housing inner portions of axles, a hydrostatic transmission, and a transmitting mechanism for transmitting power to the axles from an output shaft of the hydrostatic transmission. The housing is partitioned by an internal wall into a chamber containing the hydrostatic transmission and a chamber containing the other transmitting mechanisms. The housing is filled with oil in common with both chambers. A trunnion for changing the output rotation of the hydrostatic transmission is disposed in parallel to the axles. A shock absorber is provided to prevent abrupt speed change. A differential locking device is attached to the differential gear to thereby improve the straightforward running capacity of the vehicle.

3 Claims, 18 Drawing Sheets

AXLE DRIVING APPARATUS

This application is a continuation of Ser. No. 09/887,251 filed Jun. 25, 2001, now U.S. Pat. No. 6,604,359 which is a continuation of Ser. No. 09/381,231 filed Oct. 27, 1999, now U.S. Pat. No. 6,272,854 which is a 371 of PCT/IB97/00240 filed Mar. 12, 1997.

FIELD OF THE INVENTION

The present invention relates to an axle driving apparatus for improving the straightforward running capacity of a vehicle on a muddy road or the like, and more particularly to an axle driving apparatus which is integrally provided with a hydrostatic transmission (hereinafter referred to as the HST); axles; a power transmitting mechanism, which can easily change the speed of the HST; an oil reservoir, which can absorb an increase in the volume of oil due to an increase in the temperature of the HST; and a differential locking device, all of which are provided in a single housing.

BACKGROUND OF THE INVENTION

Conventionally, an axle driving apparatus consists of a housing for an HST, axles and a power transmitting device for interconnecting the HST and axles. On the center section of the HST is disposed a hydraulic pump, provided with a vertical input shaft, and a hydraulic motor, provided with a horizontal output shaft. A plurality of pistons are disposed in the hydraulic pump cylinder block. The heads of the pistons abut against a movable swash plate. Changing the angle of the movable swash plate changes the pump capacity so as to increase or decrease the number of rotations of the hydraulic motor. The movable swash plate is slanted, thereby enabling the speed of the HST to be changed by rotatably operating trunnions supported in the housing. Each trunnion is disposed on a longitudinally slanted axis of the swash plate, as disclosed in U.S. Pat. No. 5,456,068, for example.

A speed change controller, such as a pedal or a lever, which is provided on the vehicle can be operated normally longitudinally thereof so that its motion can be transmitted to a control arm of the axle driving apparatus through a link mechanism, such as a rod, disposed longitudinally of the vehicle. Hence, it is preferable that the control arm swing longitudinally around the lateral axis. One conventional construction is provided with a vertical operating shaft, independent of the trunnions, where both trunnions and the vertical operating shaft interlock with each other. The control arm is provided at one end of the operating shaft so that the control arm swings longitudinally around the vertical axis, and the other end is constructed so that the trunnion projects at the axial end thereof from the front wall of the housing. A control arm is provided at the axial end so that the control arm swings laterally around the longitudinal axis. A complex linkage mechanism, with respect to the vertical operating shaft and trunnions, is required in the first construction described above, thereby increasing the number of parts and assembly time, making the axle driving apparatus too expensive to produce. The second construction described above requires a separate link mechanism for converting the longitudinal motion into a lateral motion, thereby requiring space to provide two link mechanisms in the vehicle, making it difficult to apply the apparatus to a vehicle of small size and increasing the number of parts required.

U.S. Pat. Nos. 5,440,951 and 5,515,747 disclose that when the HST and the mechanism for transmitting power to the axles from the HST are housed in the same housing, the housing can be filled with oil to be used as both operating oil for the HST and lubricating oil for the transmitting mechanism. In this case, a foreign object, such as iron powder, created by the rubbing of the transmitting mechanism may flow toward the HST. The iron powder or other foreign object is removed by an oil filter so as not to enter into the HST closed fluid circuit. However, the iron powder or the like may encroach on the piston and swash plate and thereby adversely affect them. The housing is integrated in part with the oil reservoir so as to enable the oil volume in the housing to be adjusted when expanded due to a rise in temperature. However, the greater the quantity of oil, the larger the increase in volume. Thus, the housing must be made larger and the reservoir therefore becomes larger so that the housing itself has to be large in size.

U.S. Pat. No. 5,094,077 discloses that in order to prevent the speed change controller equipped on the vehicle from being hastily operated by an operator, a shock absorber is provided on the control arm. The shock absorber should be disposed above the upper wall of the housing because the control arm is configured to vertically and longitudinally swing around the axis on the upper wall of the housing. Therefore, space for disposing the shock absorber without interference with an input pulley or an enlarged portion of the upper wall of the housing is required.

Further, where a differential gear is provided between the left and right axles, when one axle is idling, a driving force cannot be transmitted to the other axle. Hence, it is desired to provide a differential locking device on the axle driving apparatus for integrating the differential locking device with the HST and the axles.

SUMMARY OF THE INVENTION

The axle driving apparatus of the present invention is partitioned by an internal wall provided within the housing, into a first chamber for housing therein the HST and a second chamber for housing therein axles and a transmitting mechanism which transmits power from an output shaft of the HST to the axles. Both chambers are filled with common oil. An oil filter is disposed therebetween to allow the chambers to communicate with each other. One chamber communicates with an oil reservoir. Trunnions for the swash plate to change the output rotation of the HST are supported between the internal wall and a side plate fixed to the housing. The trunnions are disposed laterally of and in parallel to the axles. One of the trunnions projects outwardly from the housing so as to fix an arm. The shock absorber is connected thereto, thereby preventing hasty speed change. A differential locking device is attached to a differential gear differentially connecting the left and right axles. During the normal running of the vehicle, the differential rotation can be performed. When one axle is idling, both axles are adapted to be directly connected to each other.

These and other objects of the invention will become more apparent from the detailed description and examples which follow.

DETAILED DESCRIPTION OF THE PREFERRED EMBODIMENTS

Figure 1:
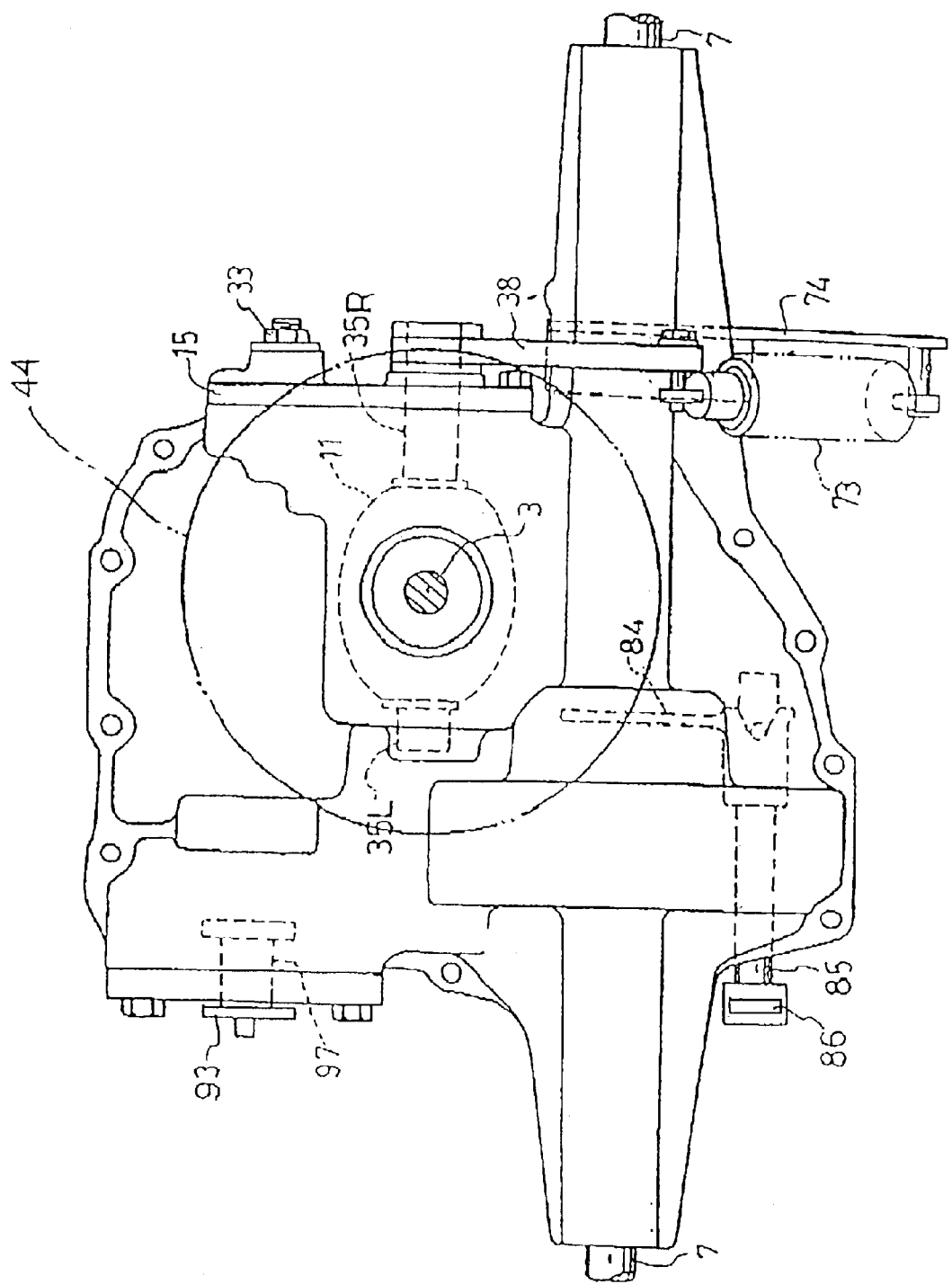
FIG. 1 is a plan view of an axle driving apparatus.

FIGS. 1–7 show the construction of an axle driving apparatus. The housing of the axle driving apparatus comprises an upper half housing 1 and a lower half housing 2 joined to each other along a horizontal, flat joint surface along the periphery of the upper and lower half housings 1,2. A bearing for a motor shaft 4 is provided on the joint surfaces of both upper half housing 1 and lower half housing 2. Bearings for axles 7 are shifted upwardly from the joint surface of both upper half housing 1 and lower half housing 2 and are disposed in upper half housing 1 to rotatably support axles 7. Axles 7 are differentially connected by a differential gear unit 23 and project laterally outwardly of the housing.

Figure 6:
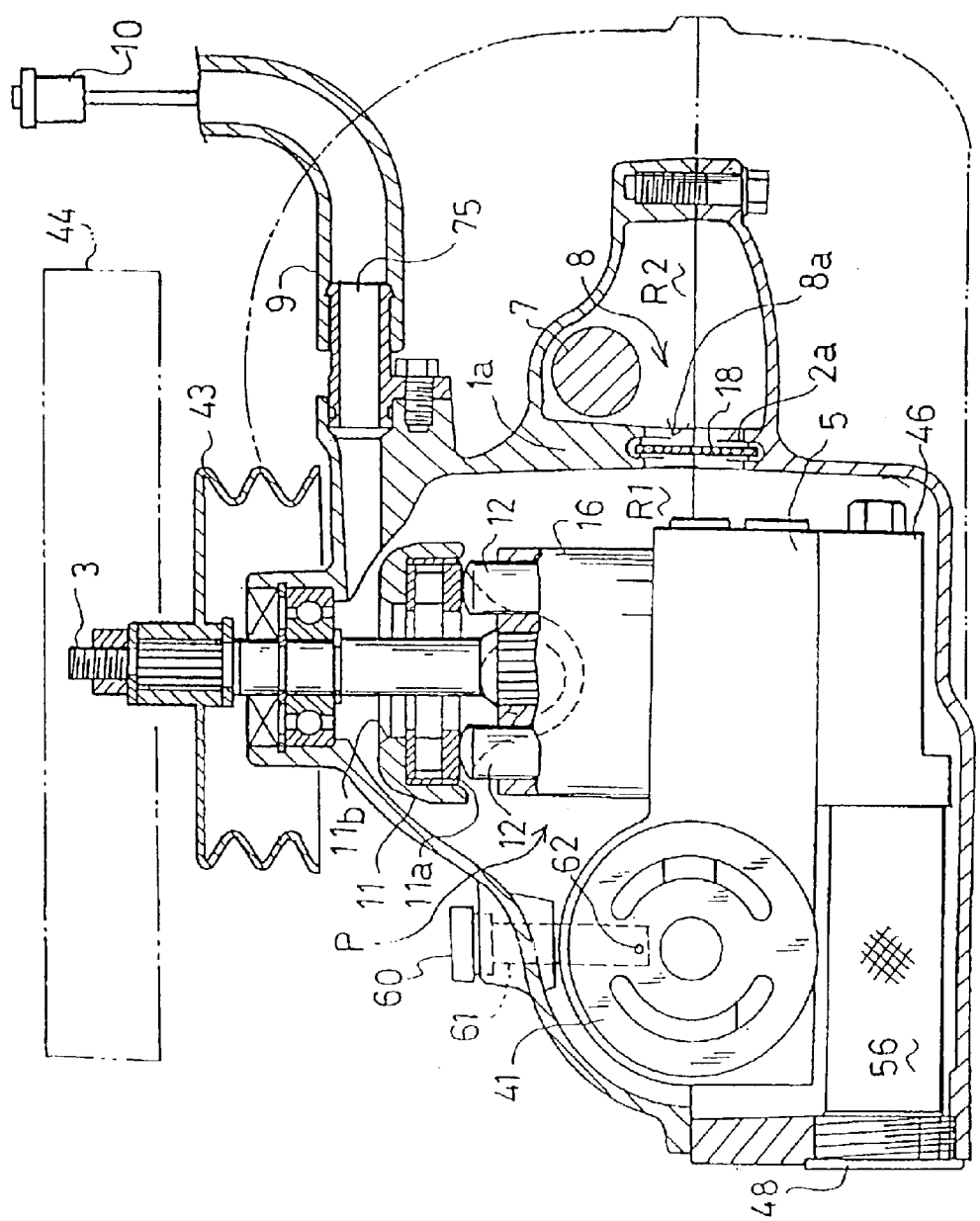
FIG. 6 is a sectional view looking in the direction of arrows 6—6 in FIG. 2.
Figure 7:
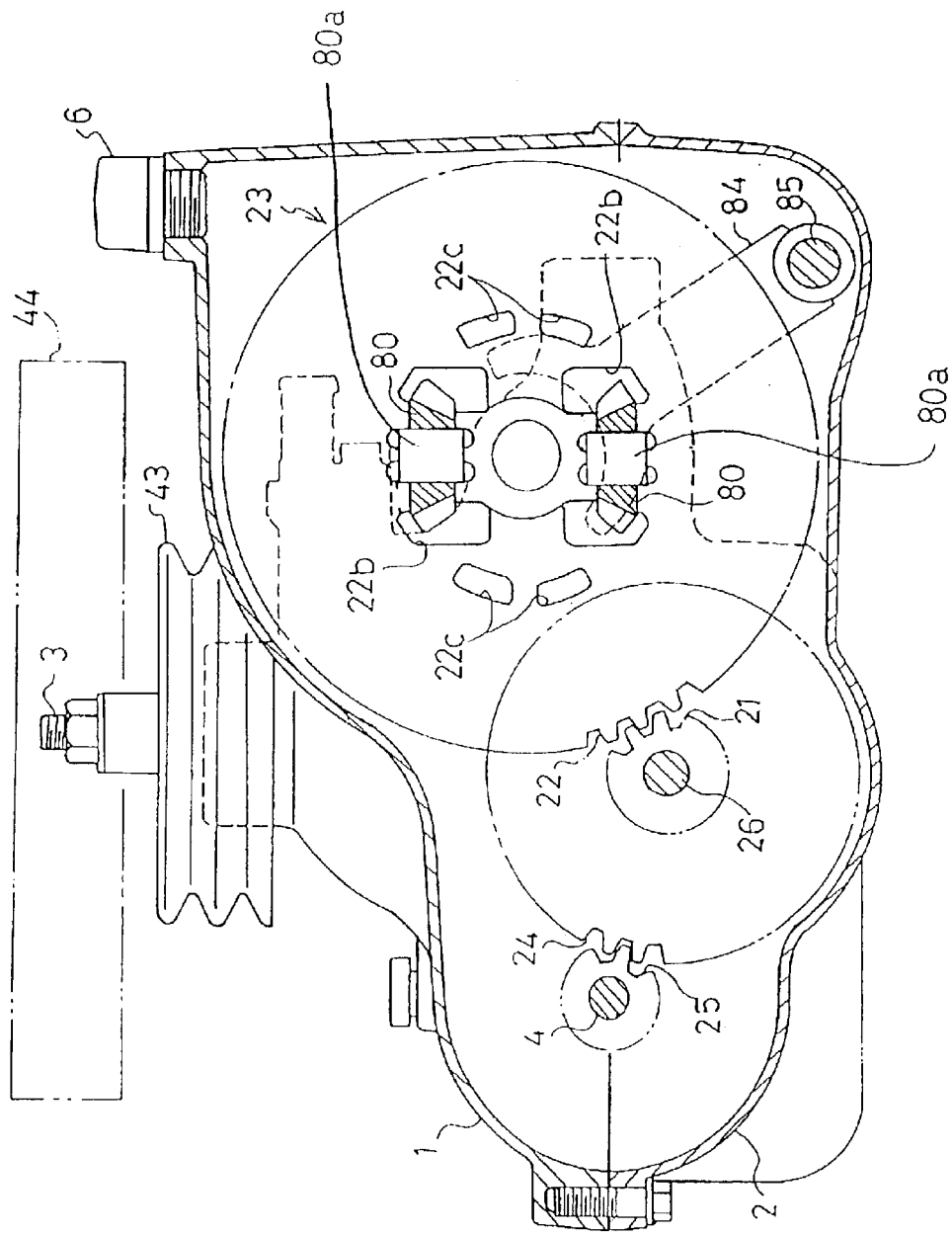
FIG. 7 is a sectional view looking in the direction of arrows 7—7 in FIG. 2.

The interior of the housing is partitioned by an internal wall 8 into a first chamber R1 for housing therein an HST and a second chamber R2 for housing therein a gear-type drive train which transmits power to differential gear unit 23 from motor shaft 4 to axles 7. First chamber R1 and second chamber R2 are filled with common oil which forms an oil sump. As shown in FIG. 7, an oil feed lid 6 is provided on an upper wall of upper half housing 1 above differential gear unit 23. The housing can be filled with operating oil through lid 6. As shown in FIG. 6, an oil flow port 75 is provided in the upper portion of upper half housing 1. Upper half housing 1 communicates through a piping 9, of rubber hose or the like, with the interior of an oil reservoir 10 mounted at a predetermined position on the vehicle, thereby enabling the volume of operating oil in oil reservoir 10 to be adjusted.

Figure 2:
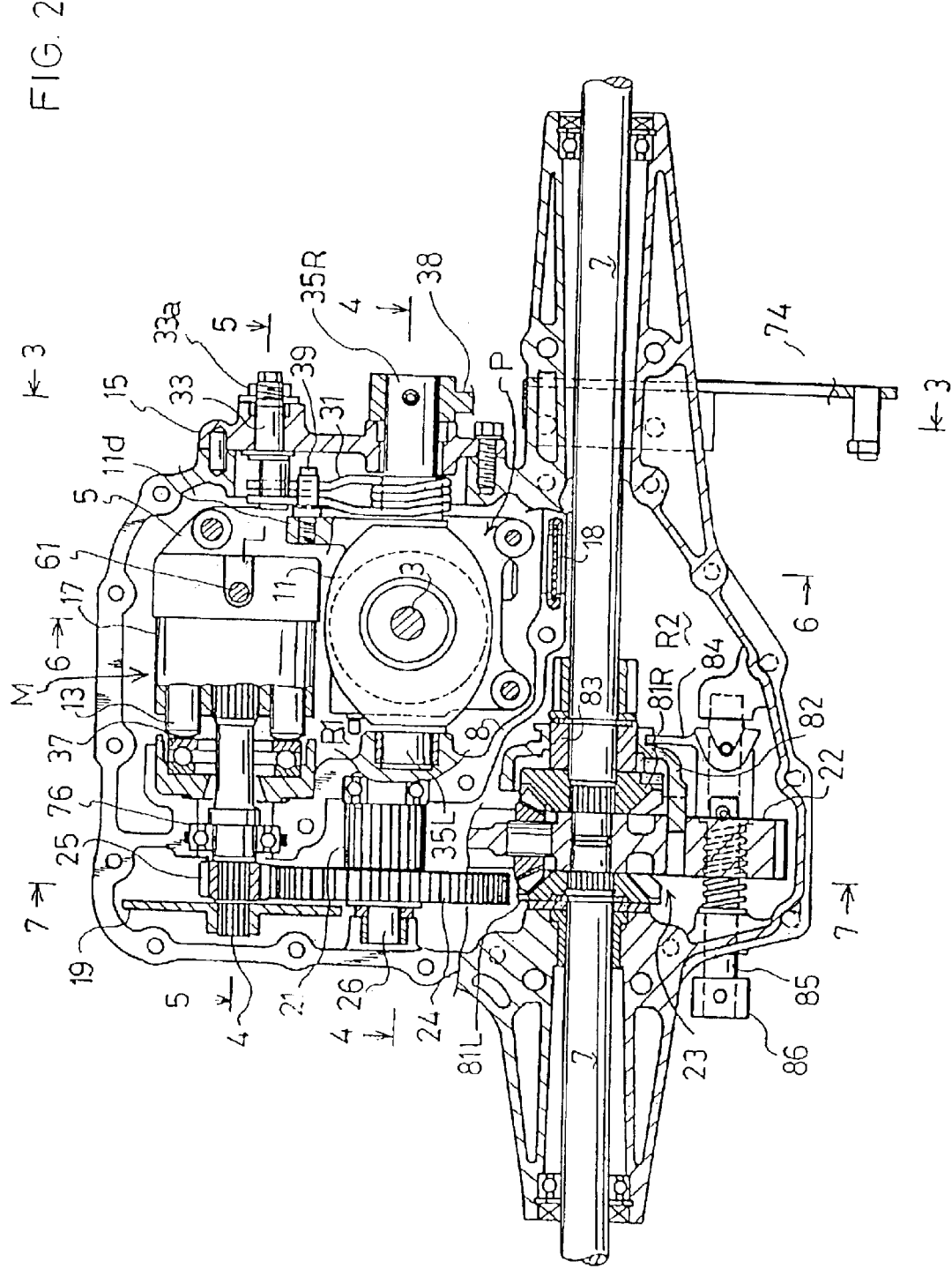
FIG. 2 is a partially sectional plan view of the same in which an upper half housing thereof is removed.

As shown in FIG. 6, an oil bore 8a is open at a predetermined position in internal wall 8 which partitions first chamber R1 from second chamber R2. An oil filter 18 covers oil bore 8a. In this embodiment, as shown in FIGS. 2 and 6, oil bore 8a and oil filter 18 are disposed on internal wall 8 between the portion containing the HST and the portion containing the right side axle 7, thereby enabling oil to flow between first chamber R1 and second chamber R2 through oil filter 18. Accordingly, oil filling the housing can be used as both operating oil for the HST and lubricating oil for the gears and bearings. When the oil enters into first chamber R1 from second chamber R2, foreign objects such as iron powder which are harmful to the HST, are filtered by oil filter 18.

Figure 4:
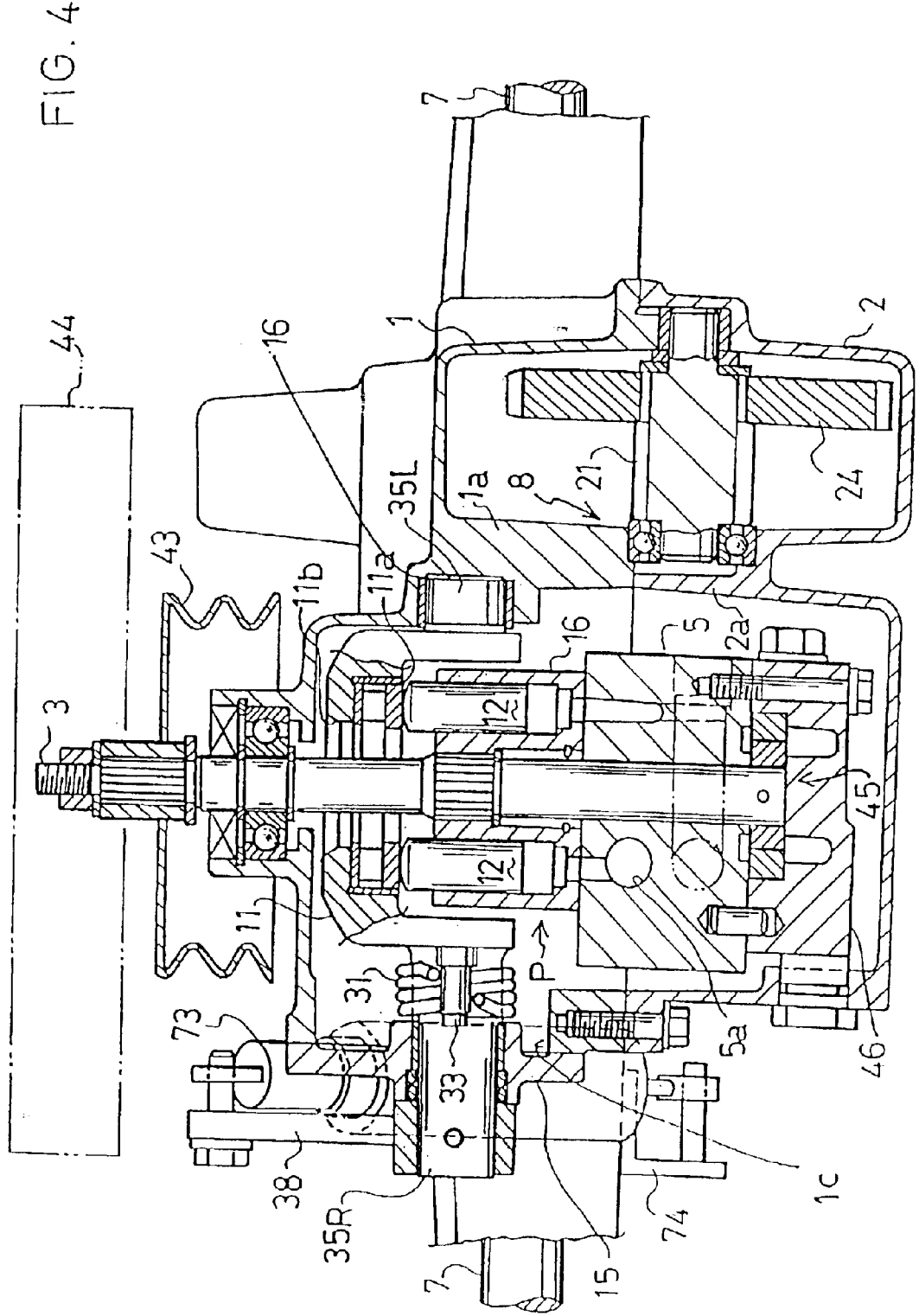
FIG. 4 is a sectional view looking in the direction of arrows 4—4 in FIG. 2.

Internal wall 8 is provided within the housing so that first chamber R1 is disposed in front of axles 7 and to the side of the drive train for transmitting power from motor shaft 4 to differential gear unit 23. Internal wall 8, as shown in FIG. 4, comprises (1) an internal wall portion 1a erected integrally with the upper inner surface of upper half housing 1 and is positioned at the end surface on the same plane as the joint surface of the housing parts 1, 2 and (2) an internal wall portion 2a erected integrally with the inner bottom surface of lower half housing 2 and positioned at the end surface on the same plane as the joint surface of the housing. When both upper half housing 1 and lower half housing 2 are joined together, the end surfaces of both internal wall portion 1a and internal wall portion 2a join each other to form internal wall 8, thereby partitioning the interior of the housing into first chamber R1 and second chamber R2.

The HST is housed in first chamber R1. The HST comprises a hydraulic pump P, a hydraulic motor M and a center section 5. Center section 5 is elongated and is longitudinally disposed in first chamber R1. A vertical surface 91 is formed at the front of center section 5 on which hydraulic motor M is disposed. A horizontal surface 90 is formed along the top of center section 5 on which hydraulic pump P is disposed. A pump shaft 3 is substantially vertically disposed on center portion 5 and is positioned between motor shaft 4 and axles 7 which extend substantially horizontally and in parallel to each other. A pump mounting surface 40 is formed on horizontal surface 90 of center section 5 for hydraulic pump P. A cylinder block 16 is rotatably and slidably disposed on pump mounting surface 40. Pistons 12 are fitted into a plurality of cylinder bores in cylinder block 16 and are reciprocally movable by biasing springs. The heads of pistons 12 abut against a thrust bearing 11a held to the movable swash plate 11. At the center of movable swash plate 11, an opening 11b is provided through which pump shaft 3 perforates. Pump shaft 3, used also as an input shaft, is disposed on the rotary axis of cylinder block 16 and is fixed thereto as that pump shaft 3 and cylinder block 16 rotate together. Pump shaft 3 projects at the upper axial end thereof outwardly from the upper wall of upper half housing 1. An input pulley 43 with a cooling fan 44 is fixed to pump shaft 3. Input pulley 43 is given power from a prime mover (not shown) through a belt transmitting mechanism (not shown).

As seen in FIG. 6, the piston abutting surface of movable swash plate 11 is disposed perpendicular to the rotary axis of cylinder block 16. Movable swash plate 11 is shown in the neutral position. Movable swash plate 11 can be tilted from side to side so as to enable the discharge amount and discharge direction of oil from hydraulic pump P to be changed. As seen in FIG. 4, for example, movable swash plate 11 is integrally provided with trunnions 35L and 35R, which project laterally from both sides of swash plate 11 and are disposed in parallel to axles 7. Movable swash plate 11, as shown in FIGS. 2 and 4, is slantingly rotatably supported between the two parallel walls of internal wall portion 1a in upper half housing 1 and the side wall of the upper half housing 1. A recess 1b is bored in the side surface of internal wall portion 1a. Recess 16 has an inner diameter about equal to the outer diameter of a bearing bush fitted on trunnion 35L. As best seen in FIG. 4, trunnion 35L is rotatably supported in recess 1b. In order to bore recess 1b in internal wall portion 1a, an opening 1c is formed in the side wall of upper half housing 1. A machining tool for boring recess 1b is inserted into upper half housing 1 through opening 1c. A side plate 15 for closing opening 1c is detachably fixed onto the outer surface of the side wall of upper half housing 1 through sealing members (not shown). Trunnion 35R extends into a hollow cylindrical portion integrally formed in side plate 15 so as to be rotatably supported therein. Movable swash plate 11 is longitudinally tilted around trunnions 35L and 35R within first chamber R1, enabling the output of hydraulic pump P to be changed.

At the outer surface of side plate 15, a plurality of fins 15a (see FIG. 3) for receiving cooling wind from cooling fan 44 are disposed in the direction of the flow of the cooling wind. Wind blowing across fins 15a lowers the temperature of oil stored in first chamber R1.

The axial end of trunnion 35R projects outwardly from side plate 15. A control arm 38 (discussed below) is fixed onto the axial end and is connected through a link or wire (not shown), to a speed change lever mounted at the driver's seat of the vehicle, so as to rotate around the lateral axis of the vehicle body. This simplifies the transmitting mechanism for slantwise control of movable swash plate 11. A neutral return coiled spring 31 is fitted onto trunnion 35R in first chamber R1. Both ends of neutral return coiled spring 31 project forwardly between an engaging pin 39 and around an eccentric shaft 33 mounted onto the inner surface of side plate 15 (see FIG. 2). Engaging pin 39 projects from an arm 11d which projects forwardly from movable swash plate 11.

Accordingly, when control arm 38 is rotated in order to change the speed of the vehicle, arm 11d rotates together therewith and one end of neutral return coiled spring 31 moves away from the other end toward engaging pin 39. The other end of neutral return coiled spring 31 is retained by eccentric shaft 33 so as to apply a biasing force to control arm 38 which tends to return to the neutral position. When the operating force to the speed change lever is released, the restoring force created at one end of neutral return coiled spring 31 returns engaging pin 39 toward eccentric shaft 33 so as to be held in a neutral position. A portion of eccentric shaft 33 extending outwardly from side plate 15 is fixed thereto through an adjusting nut 33a, which can be released to properly rotatably shift eccentric shaft 33, thereby shifting arm 11d around trunnion 35R through neutral return coiled spring 31. This enables movable swash plate 11 to be adjusted to the accurate neutral position.

Figure 3:
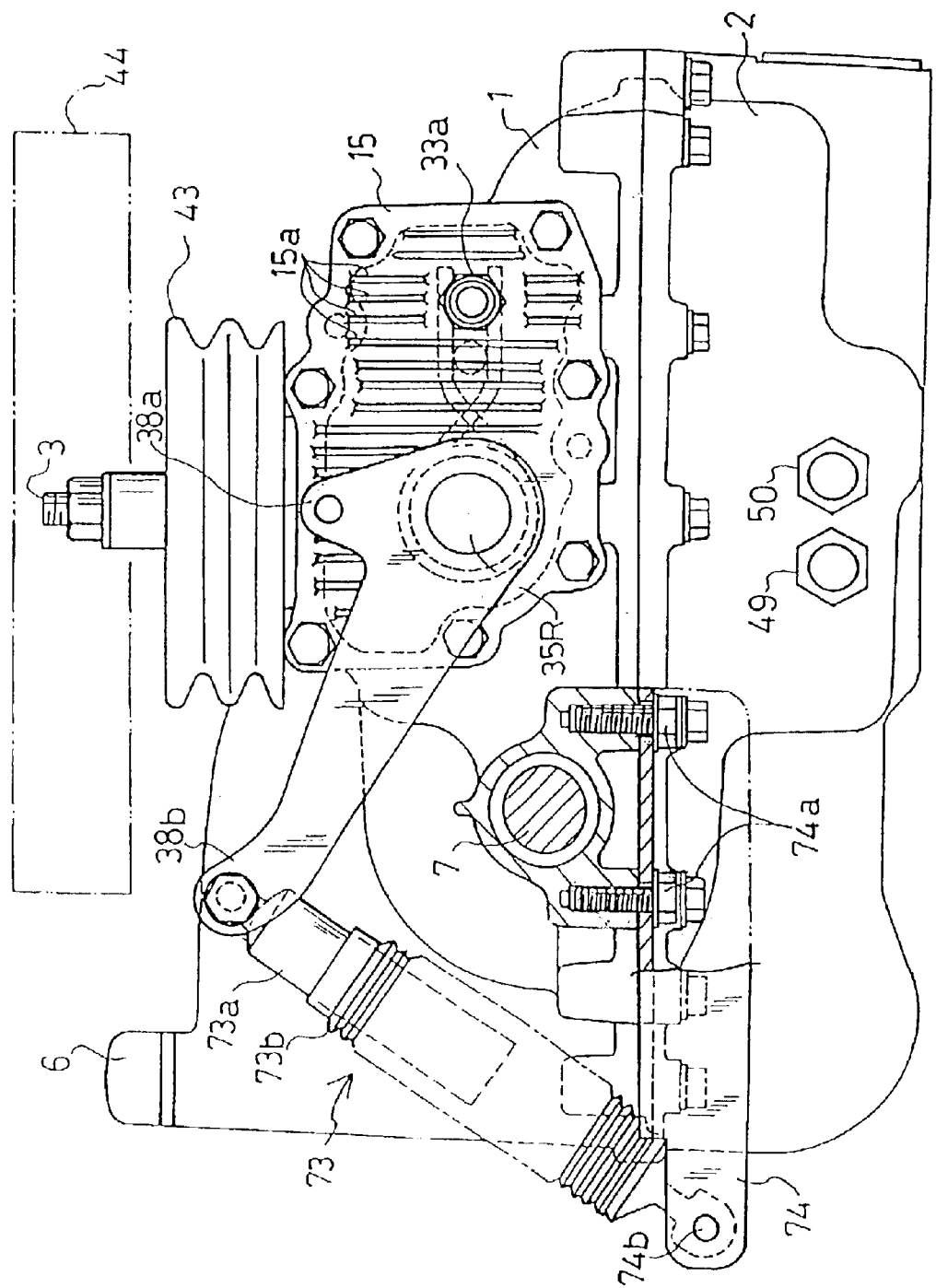
FIG. 3 is a sectional view looking in the direction of arrows 3—3 in FIG. 2.

Control arm 38 is fixed to the end of trunnion 35R which extends outside of the housing, as shown in FIG. 3. Control arm 38 is substantially V-shaped, with a first retaining portion 38a and a second retaining portion 38b. First retaining portion 38a projects upwardly to connect with a speed changing member such as a lever or pedal (not shown), and with trunnion 35R when the speed change force is applied. Second retaining portion 38b projects slantwise rearwardly of the vehicle to connect with one end of a movable portion 73a of a shock absorber 73. Shock absorber 73 and control arm 38 are formed to straddle right axle 7. The base of a fixed portion 73b of shock absorber 73 is pivotally supported to a mounting pin 74b. Mounting Pin 74b is mounted to the rear end of a support plate 74 fixed through mounting bolts 74a to the lower surface of a sleeve for right axle 7. Thus, shock absorber 73 connects with control arm 38 so as to prevent a rapid speed change operation. Further, the operating force of the speed changing member, when released, does not rapidly return swash plate 11 to its neutral position, due to the spring force of neutral return coiled spring 31. This prevents an abrupt stop of the vehicle caused by the braking action of the HST.

Because shock absorber 73 is disposed longitudinally along one side of the housing, it is not necessary to consider the height of input pulley 43 or an enlarged portion of the housing. A reasonable connection and arrangement is provided allowing control arm 38 to be swung along a lateral axis of the apparatus.

Figure 5:
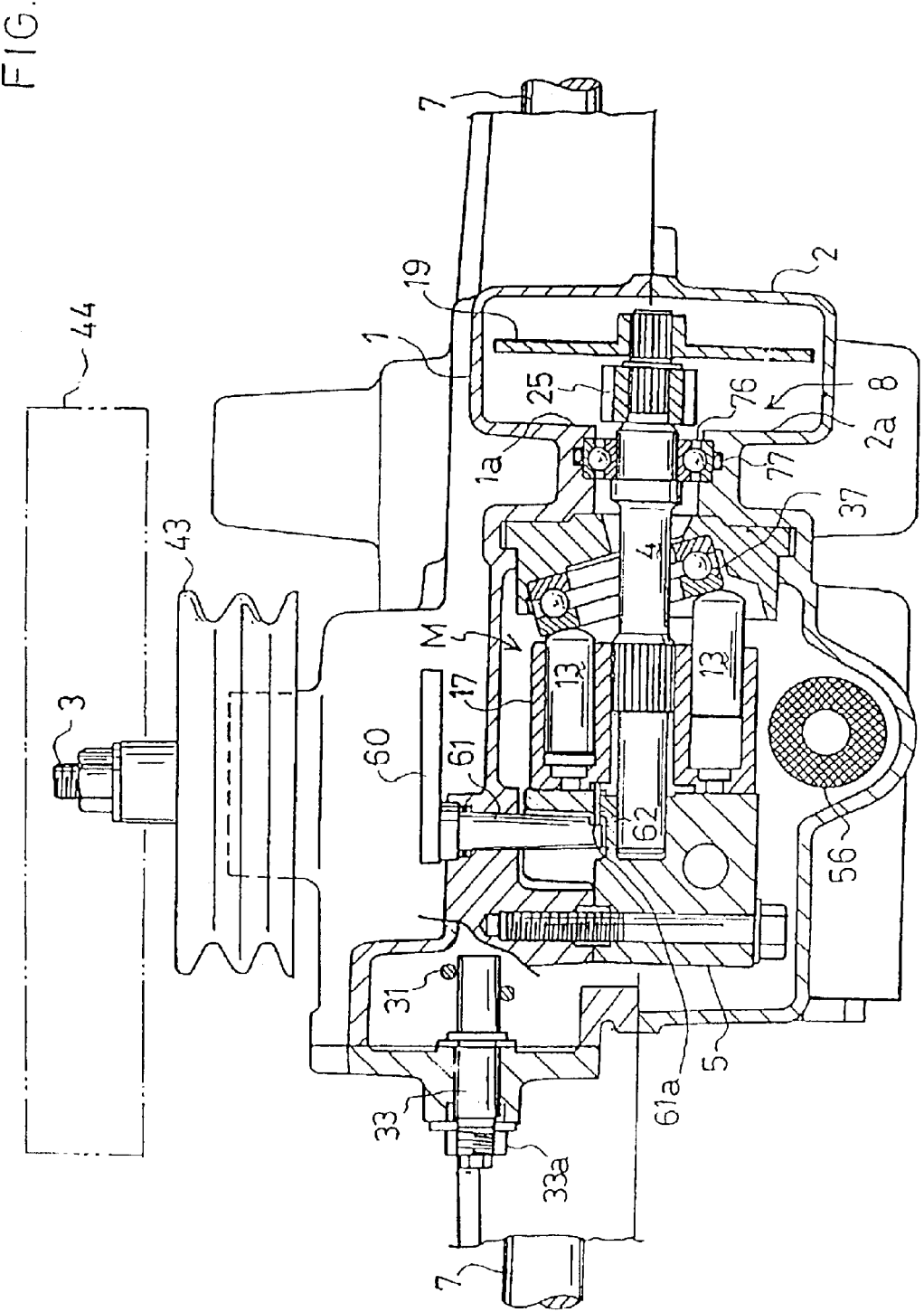
FIG. 5 is a sectional view looking in the direction of arrows 5—5 in FIG. 2.

Pressure oil from hydraulic pump P is sent to hydraulic motor M through an oil passage in center section 5. Hydraulic motor M, as shown in FIG. 5, is constructed so that a motor mounting surface 41 is formed along vertical surface 91 of center section 5. A cylinder block 17 is rotatably slidably mounted to motor mounting surface 41. A plurality of pistons 13 are reciprocally movably inserted into a plurality of cylinder bores in cylinder block 17 through biasing springs. A thrust bearing, held to a fixed swash plate 37, abuts against the heads of pistons 13. Fixed swash plate 37 is fixedly positioned between upper half housing 1 and lower half housing 2. Motor shaft 4 is disposed on the rotary axis of cylinder block 17 and is fixed thereto so that motor shaft 4 and cylinder block 17 move together. One end of motor shaft 4 is supported in a shaft bore provided at the center of motor mounting surface 41 of center section 5. The other end of motor shaft 4 perforates through internal wall 8, formed at the joint surface of upper half housing 1 and lower half housing 2, so as to enter into second chamber 2. Motor shaft 4 is rotatably supported by a bearing 76 fitted into internal wall 8. Bearing 76 includes an oil-tight seal in order to partition first chamber R1 and second chamber R2. In particular, an O-ring 77 is provided on the outer periphery of bearing 76.

Figure 9:
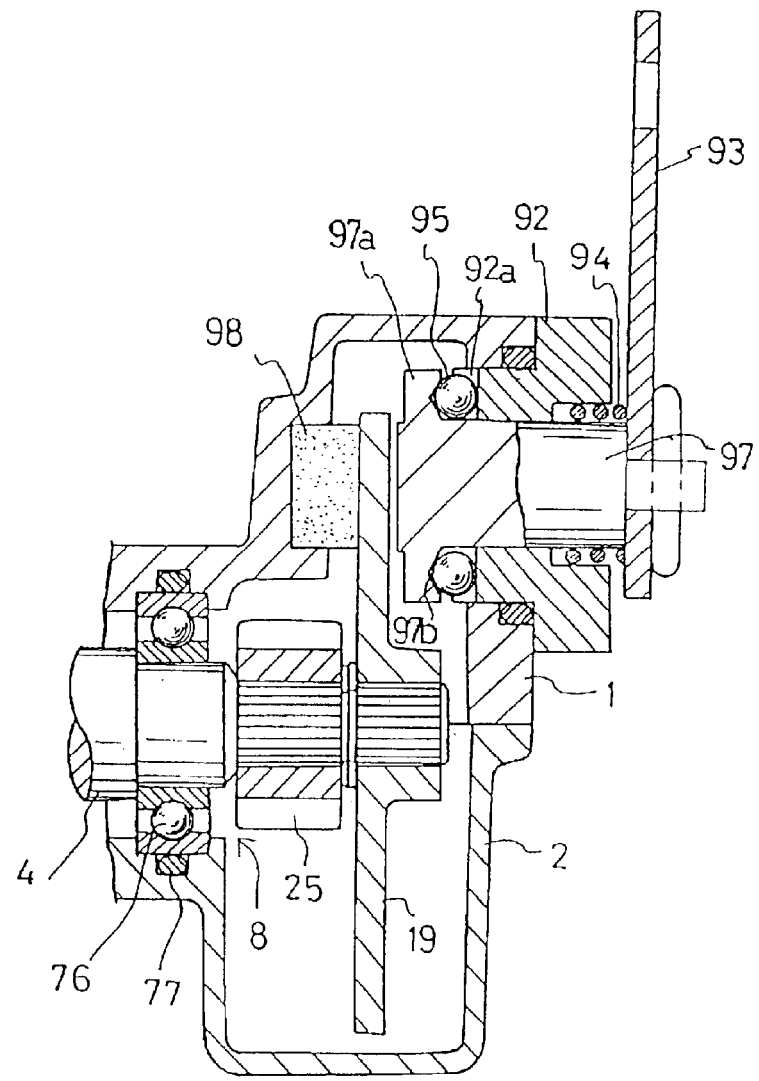
FIG. 9 is an enlarged sectional side view of a principal portion of the same.

A brake disc 19 is fixed to one axial end of motor shaft 4 positioned in second chamber R2. As shown in FIG. 9 a brake pad 98 is fitted into the inner surface of upper half housing 1 positioned at one side of the upper portion of brake disc 19. At the opposite side of brake disc 19, a brake operating shaft 97 is supported which perforates the wall of upper half housing 1 from the outside to the inside thereof through a support plate 92. Brake pad 98 and the end surface of brake operating shaft 97 are opposite to each other. Brake disc 19 is sandwiched therebetween. Brake operating shaft 97 is supported in parallel to motor shaft 4. A brake arm 93 is fixed to the end of brake operating shaft 97 outside of the housing. A spring 94 is fitted onto brake operating shaft 97 between brake arm 93 and support plate 92, so as to bias the end surface of brake operating shaft 97 away from brake disc 19.

Figure 8:
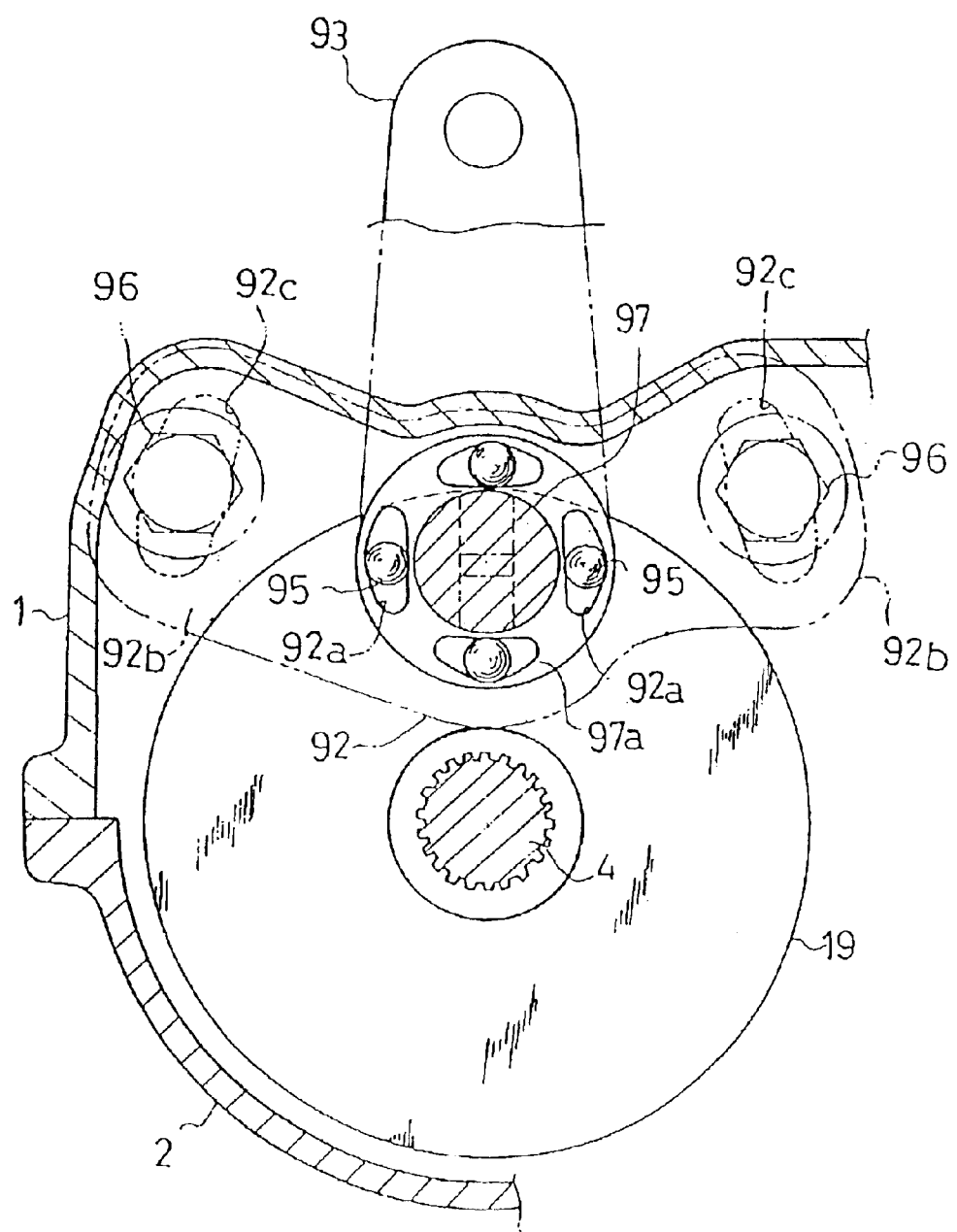
FIG. 8 is an enlarged sectional plan view of a principal portion of the mechanism of a braking device.
Figure 10:
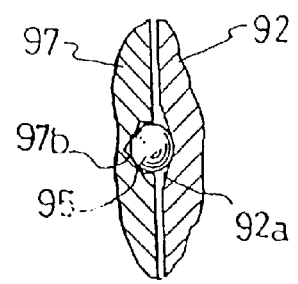
FIG. 10 is a enlarged sectional view of only a part of a principal portion of the same.

A flange 97a is formed within the housing at one end of brake operating shaft 97. A plurality (four in this embodiment) of groves 97b are provided at the surface of flange 97a facing the inner surface of the housing. Cam grooves 92a, each V-shaped in cross-section and arcuate when viewed in plan are provided at the end surface of support plate 92, opposite to grooves 97b. As shown in FIG. 10, balls 95 are interposed between cam grooves 92a and grooves 97b. In such construction, when brake arm 93 is rotated, brake operating shaft 97 rotates along its longitudinal axis. Balls 95, held by recesses 97b, slowly ride onto the shallowest portions of cam groove 92a from the deepest portions thereof. This causes brake operating shaft 97 to slidably move, due to the thrust generated thereon by balls 95, toward brake disc 19 thereby sandwiching brake disc 19 between brake pad 98 and the end surface of brake operating shaft 97 so as to brake motor shaft 4. Flanges 92b, which extend radially and are V-shaped, are integrally provided at the outer end of support plate 92 (see FIG. 8). Elongate slots 92c, which are oval-arcuate shaped are open in flanges 92b around brake operating shaft 97. Bolts 96 are inserted into elongate slots 92c, thereby fixing support plate 92 onto the outer surface of the side wall of upper half housing 1. Bolts 96 may be unscrewed to properly rotate flanges 92b around brake operating shaft 97, thereby enabling balls 95 to adjust the length of time during which balls 95 ride on cam groove 97b.

Next, explanation will be given on the construction of center section 5 for loading thereon hydraulic pump P and hydraulic motor M in accordance with FIGS. 11 through 21. Center section 5 is longitudinally elongated and is provided at one side thereof with a bolt bore 5h and at another side thereof with two bolt bores 5h. Three mounting bolts are inserted into bolt bores 5h and are used to fix center section 5 to the inner wall of upper half housing 1 in first chamber R1. At the center of pump mounting surface 40 and at the rear and upper surface of upper half housing 1 is formed a bearing bore for rotatably supporting the lower end of pump shaft 3. A pair of arcuate ports 40a and 40b are open longitudinally through center section 5 around a bearing bore. Feed or discharge oil is communicated with cylinder block 16 through parts 40a and 40b. At the center of motor mounting surface 41, vertically disposed in front of pump mounting surface 40, is bored a bearing bore for rotatably supporting one end of motor shaft 4. A pair of arcuate ports 41a and 41b are open vertically and around the bearing bore, thereby communicating feed or discharge oil with cylinder block 17.

Figure 12:
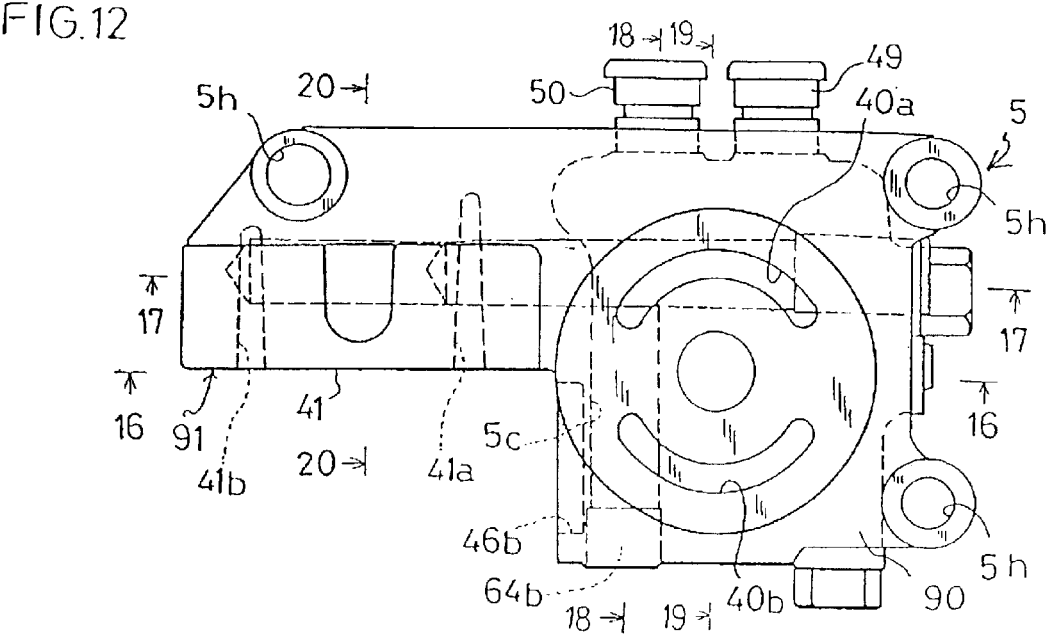
FIG. 12 is a plan view of the same.
Figure 11:
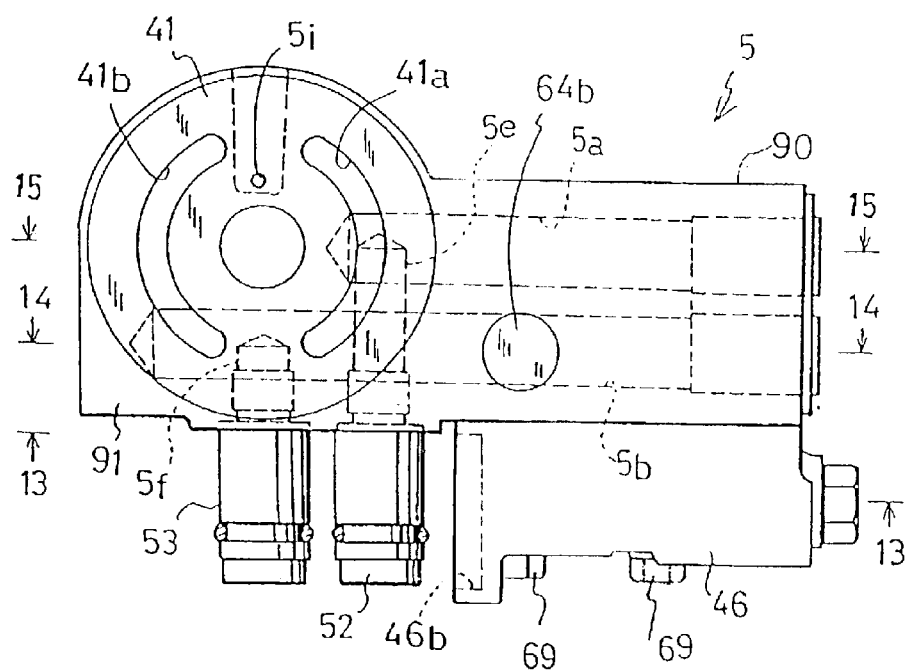
FIG. 11 is a left side view of a center section of the present invention.
Figure 16:
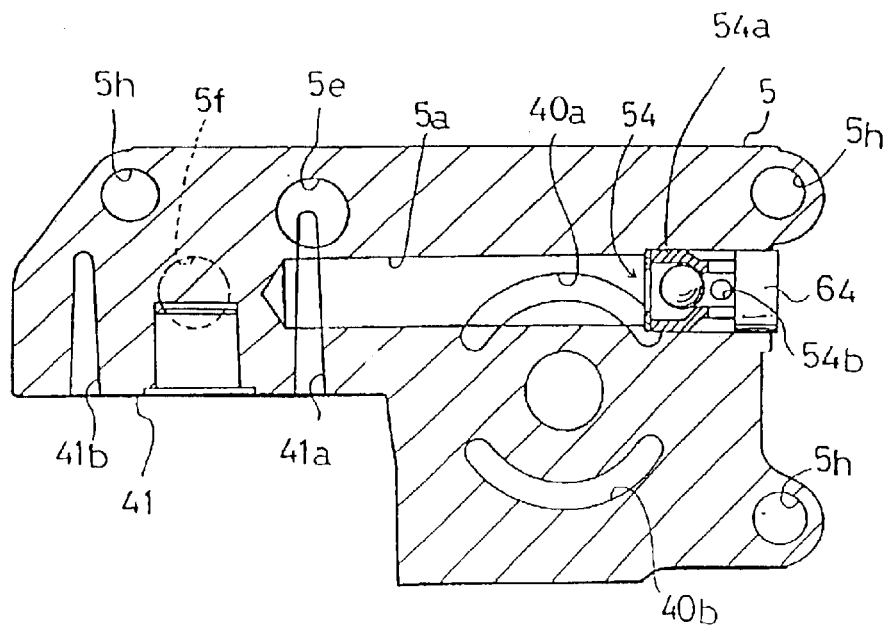
FIG. 16 is a sectional view looking in the direction of arrows 16—16 in FIG. 12.
Figure 17:
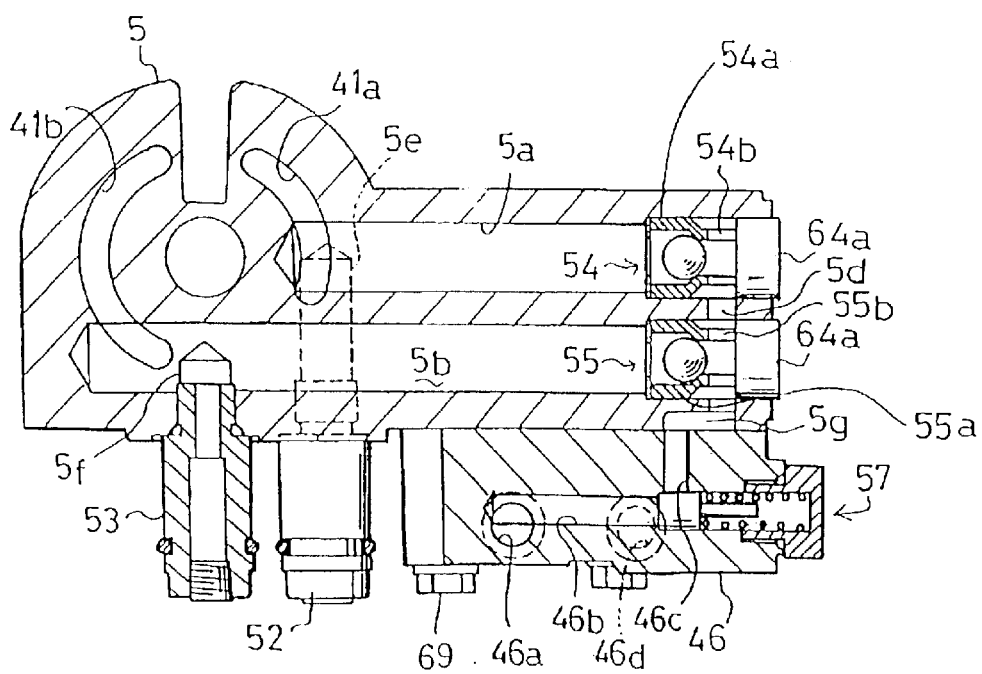
FIG. 17 is a sectional view looking in the direction of the arrows 17—17 in FIG. 12.
Figure 18:
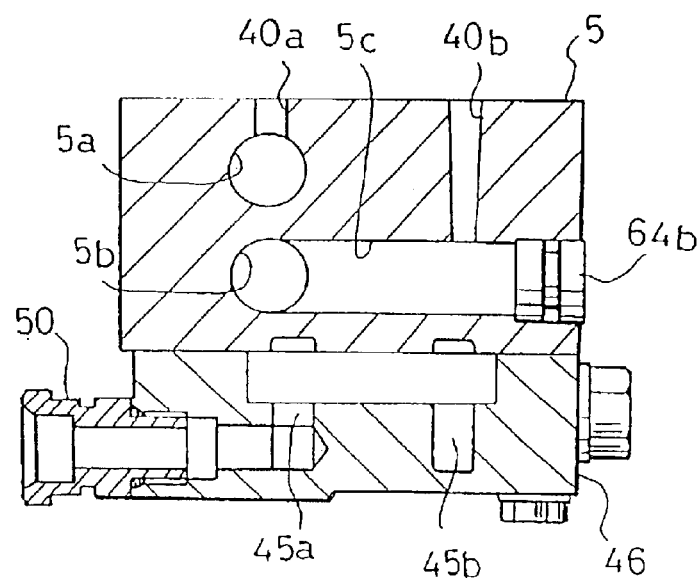
FIG. 18 is a sectional view looking in the direction of the arrows 18—18 in FIG. 12.

In order to connect arcuate ports 40a and 40b at pump mounting surface 40 with arcuate ports 41a and 41b at motor mounting surface 41, a first linear oil passage 5a and a second linear oil passage 5b are bored in a thick portion of center section 5, in parallel to each other. As shown in FIG. 12, the center of pump mounting surface 40 is positioned along an imaginary vertical plane (line 16—16) disposed along motor mounting surface 41. Half of cylinder block 16 mounted on pump mounting surface 40 (as shown in FIG. 2) overlaps, when viewed from above, with half of cylinder block 17 disposed on motor mounting surface 41. This arrangement permits the HST and first chamber R1 which contains the HST to be smaller in lateral width. A third linear oil passage 5c communicates horizontally and perpendicularly with an intermediate portion of second oil passage 5b. Arcuate port 40a at pump mounting surface 40, as shown in FIG. 18, is shallow and directly communicates with first oil passage 5a. Arcuate port 40b is deeper to communicate with third oil passage 5c. Arcuate port 41a at motor mounting surface 41 is deeper at the upper portion thereof to communicate with first oil passage 5a and shallow at the lower portion thereof, as shown in FIGS. 16 and 17. Arcuate port 41b communicates, at the lower portion thereof, with second oil passage 5b. Thus, first oil passage 5a communicates with arcuate port 40a and with arcuate port 41a, while second oil passage 5b and third oil passage 5c communicate with arcuate port 40b and with arcuate port 41b, so as to form a closed fluid circuit in center section 5.

With reference to FIG. 17, check valves 54 and 55 are disposed at the open ends of first oil passage 5a and second oil passage 5b respectively. Both first oil passage 5a and second oil passage 5b are closed by plug members 64a in which check valves 54 and 55 are disposed, respectively. The open end of third oil passage 5c is closed by a plug member 64b. Check valves 54 and 55 communicate at the inlet sides thereof with oil passage 5d through oil bores 54b and 55b provided at casings 54a and 55a. The open end of oil passage 5d is positioned in a recess 5g formed at the lower surface of center section 5. At the lower surface of center section 5, opposite to pump mounting surface 40, a charge pump casing 46 is mounted through a plurality of mounting bolts 69. A trochoid-type charge pump 45 is housed (see FIG. 4) in a recess formed at a center of the upper surface of charge pump casing 46. Trochoid-type charge pump 45 is provided with internal teeth and external teeth. The lower end of pump shaft 3 projects downwardly from center section 5 and engages with the external teeth so as to drive charge pump 45. Charge pump 45, however, may be of an external gear type or other known type.

Figure 13:
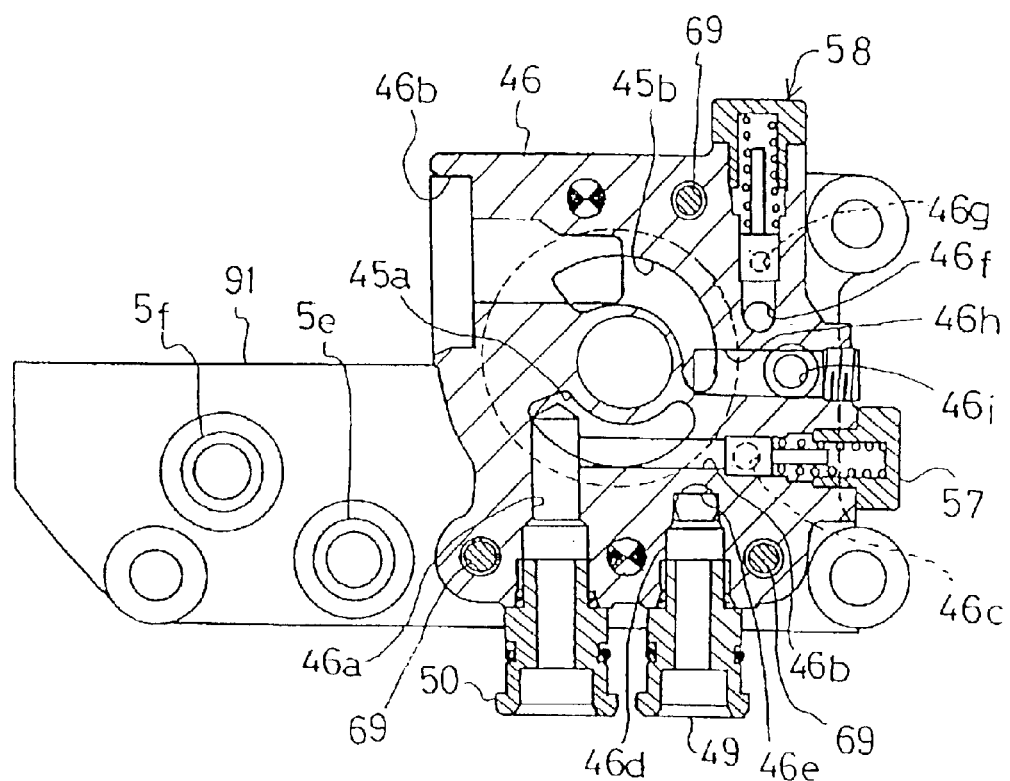
FIG. 13 is a sectional view looking in the direction of arrows 13—13 in FIG. 11.
Figure 14:
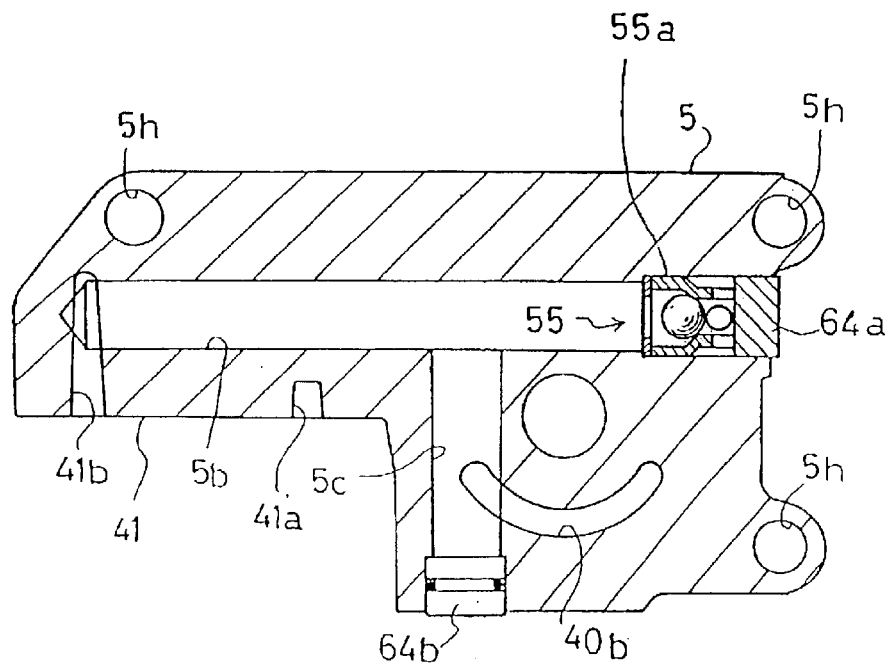
FIG. 14 a sectional view looking in the direction of arrows 14—14 in FIG. 11.
Figure 15:
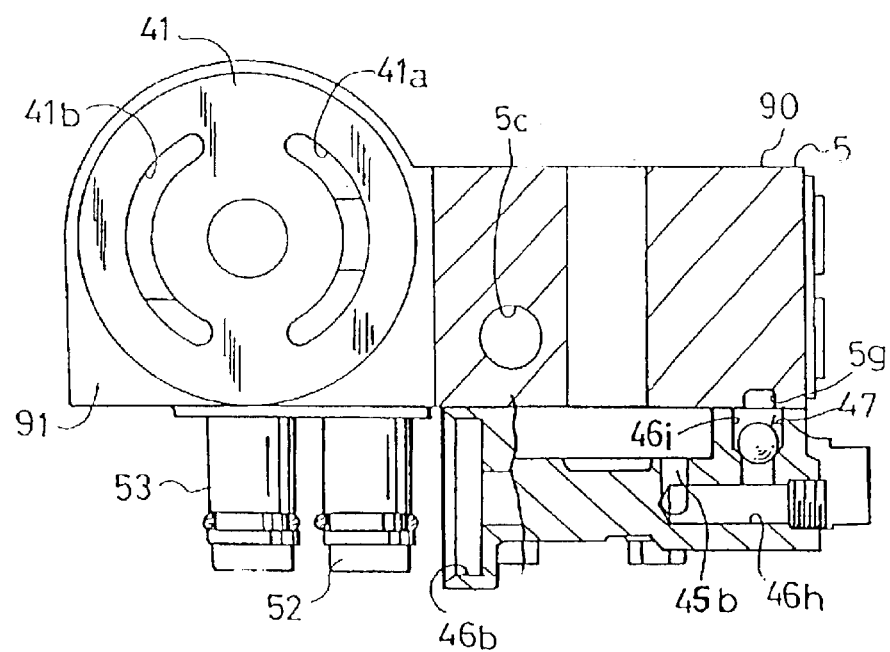
FIG. 15 is a sectional view looking in the direction of arrows 15—15 in FIG. 11.
Figure 19:
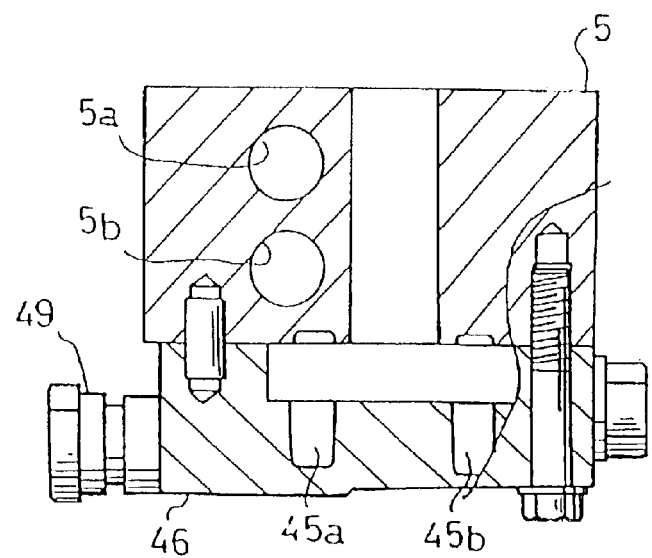
FIG. 19 is a sectional view looking in the direction of the arrows 19—19 in FIG. 12.
Figure 20:
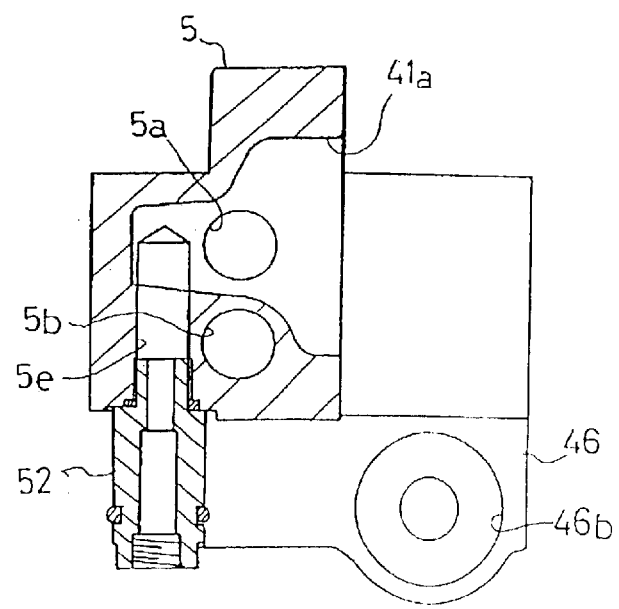
FIG. 20 is a sectional view looking in the direction of the arrows 20—20 in FIG. 12.
Figure 21:
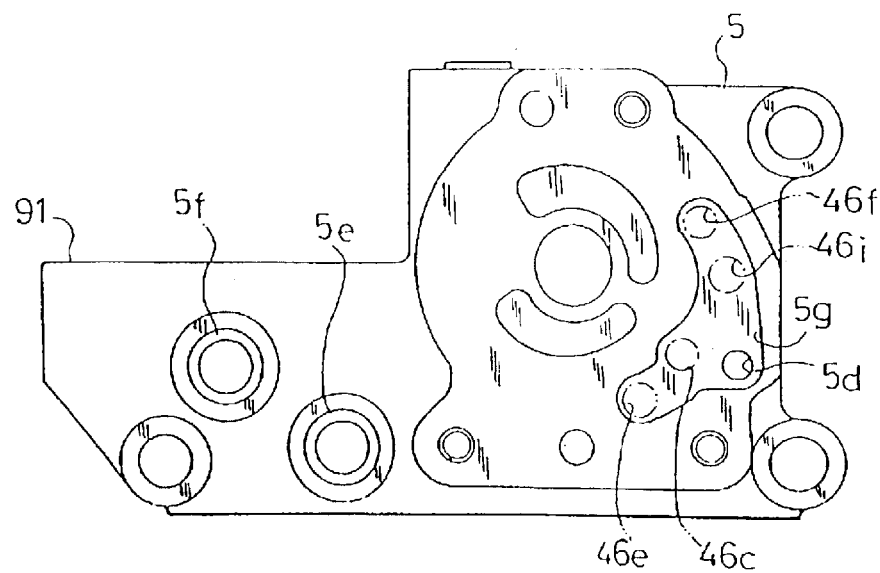
FIG. 21 is a bottom plan view of the center section from which the charge pump has been removed.

As seen in FIGS. 18 and 19, charge pump 45 has a discharge port 45a and an intake port 45b. Intake port 45b communicates with an opening 46b (FIG. 17) into which the open end of a cylindrical oil filter 56 is inserted (see FIGS. 5 and 6). Oil filter 56 is disposed under hydraulic motor M in first chamber R1. Oil filter 56 is insertable into charge pump casing 46 which is in the housing from the exterior thereof through an insertion bore open at the front wall of lower half housing 2. Oil filter 56 is interposed between charge pump casing 46 and a plug member 48 which closes the insertion bore at the front wall of lower half housing 2. Plug member 48 can be removed to facilitate maintenance and inspection of oil filter 56. A pair of oil joints 49 and 50 project from the a side surface of charge pump casing 46 (FIG. 13). The ends of joints 49 and 50, as shown in FIG. 3, are exposed at a lower portion of the outside surface of lower half housing 2. Oil joints 49 and 50 function as an oil pressure source for hydraulic actuators equipped outside of the vehicle.

Oil joint 50 is formed to serve as an oil takeout port and communicates with discharge port 45a of charge pump 45 through an oil passage 46a as shown in FIG. 13. A first relief valve 57, for setting the oil pressure of discharge port 45a, is housed in charge pump casing 46 and is connected to an oil passage 46c which is branched from oil passage 46a. Relief oil discharged from first relief valve 57 flows into recess 5g at the lower surface of center section 5 through oil passage 46c. Oil joint 49 is formed to be an oil return port and to communicate with recess 59 of center section 5 through oil passages 46d and 46e. A second relief valve 58 for setting the oil pressure in recess 5g to be supplied to the closed circuit of the HST is housed in charge pump casing 46 and connects with recess 5g through an oil passage 46f. Relief oil discharged from second relief valve 58 is discharged outwardly from charge pump casing 46 through an oil passage 46g.

As seen in FIG. 17, when charge pump 45 is driven, oil flowing into recess 5g through the oil passage 46c is adjusted by second relief valve 58. This causes check valve 54 or 55 to open through oil passage 5d at the low pressure side of one of oil passages 5a, 5b or 5c, thereby forcibly supplying operating oil into the closed fluid circuit for the HST.

When the vehicle is stopped on a sloping surface, and the HST is put in the neutral position without the parking brake exerted, the force causing the driving wheels of the vehicle to roll acts on the closed fluid circuit of the HST to generate pressure so as to cause negative pressure in the closed fluid circuit and possibly causing the vehicle to move. In order to prevent such a phenomenon, a check valve 47 (see FIG. 15) is housed in charge pump casing 46 which can supply operating oil to the closed fluid circuit of the HST even when charge pump 45 is not driven. Check valve 47 communicates at the inlet side thereof with intake port 45b through an oil passage 46h and at the outlet side with recess 5g through an oil passage 46i. When charge pump 45 is driven to flow operating oil into recess 5g though oil passages 46c and 46e, check valve 47 closes between oil passage 46h and oil passage 46i. When charge pump 45 is not driven, causing negative pressure on the low pressure side of the closed circuit, check valve 47 is open to enable oil filtered by filter 56 to be guided from intake port 45b and oil passages 46h and 46i into recess 5g. Check valve 54 or 55, at the negative pressure side of the closed fluid circuit, is open through oil passage 5d, whereby oil is supplied to the closed fluid circuit. Thus, oil can be maintained in the closed fluid circuit at all times.

In order to place operating oil into the closed fluid circuit after the axle driving apparatus is assembled, oiling pipes 52 and 53 are disposed at the lower surface of center section 5 as shown in FIGS. 11, 15, 17 and 20. At the lower surface of center section 5, a fourth vertical passage 5e is bored to communicate with the upper deep portion of arcuate port 41a. A fifth vertical oil passage 5f is bored to communicate with second oil passage 5b. Oiling pipes 52 and 53 are mounted into oil passages 5e and 5f respectively and are opened at the lower ends thereof outwardly from the bottom wall of lower half housing 2 and closed at the open ends by use of plug members after the closed fluid circuit is filled with operating oil.

As shown in FIGS. 2 and 5, a by-pass arm 60 for opening the interior of the closed circuit to the oil sump, in order to enable the axle to be idle during hauling of the vehicle, is disposed in the upper portion of upper half housing 1. In particular, by-pass arm 60 is fixed at its base onto the upper end of a by-pass shaft 61, which is vertically, rotatably and pivotally supported to the upper wall of upper half housing 1. By-pass shaft 61 extends at its lower end into a thick portion of motor mounting portion 41 of center section 5. A flat surface 61a is formed at a part of the outer periphery of the lower end of by-pass shaft 61. A through-bore 5i (see FIG. 11) is open at motor mounting surface 41 of center section 5 slightly above the center thereof and between arcuate port 41a and 41b. A push pin 62 (see FIG. 5) is slidably supported into through-bore 5i along the rotary axis of cylinder block 17. One end surface of push pin 62 can abut against the rotary sliding surface of cylinder block 17 in close contact with the motor mounting surface 41. The other end surface abuts against flat surface 61a of by-pass shaft 61.

Thus, when an operator operates a by-pass operating lever (not shown) equipped on the vehicle when the vehicle is hauled, by-pass shaft 61 is rotated through by-pass arm 60. Push pin 62 is pushed toward cylinder block 17 by the flat surface of the lower end of by-pass shaft 61. Push pin 62 moves the cylinder block 17 above motor mounting surface 41. First oil passage 5a and second oil passage 5b communicate with the oil sump of the housing through arcuate ports 41a and 41b respectively, thereby enabling motor shaft 4 to freely rotate.

As shown in FIGS. 2 and 7, the drive train for transmitting power from motor shaft 4 to differential gear 23 is constructed with a gear 25 provided on a portion of motor shaft 4 entering into second chamber R2, for engaging with a larger diameter gear 24, fixed onto a counter shaft 26. A smaller diameter gear 21 is also fixed onto counter shaft 26 and engages with an input gear 22. Power from motor shaft 4 is reduced in speed by gears 25, 24 and 21 to drive differential gear unit 23 by input gear 22. Larger diameter gear 24, on counter shaft 26, is disposed to the side of input gear 22 and overlaps in part therewith. Counter shaft 26 is rotatably housed in lower half housing 2 and is supported at both axial ends in a recess formed on the side wall of lower half housing 2 and a recess formed on the internal wall 2a of lower half housing 2, as shown in FIG. 2, so as to be rotatably supported when lower half housing 2 is joined with upper half housing 1.

Figure 22:
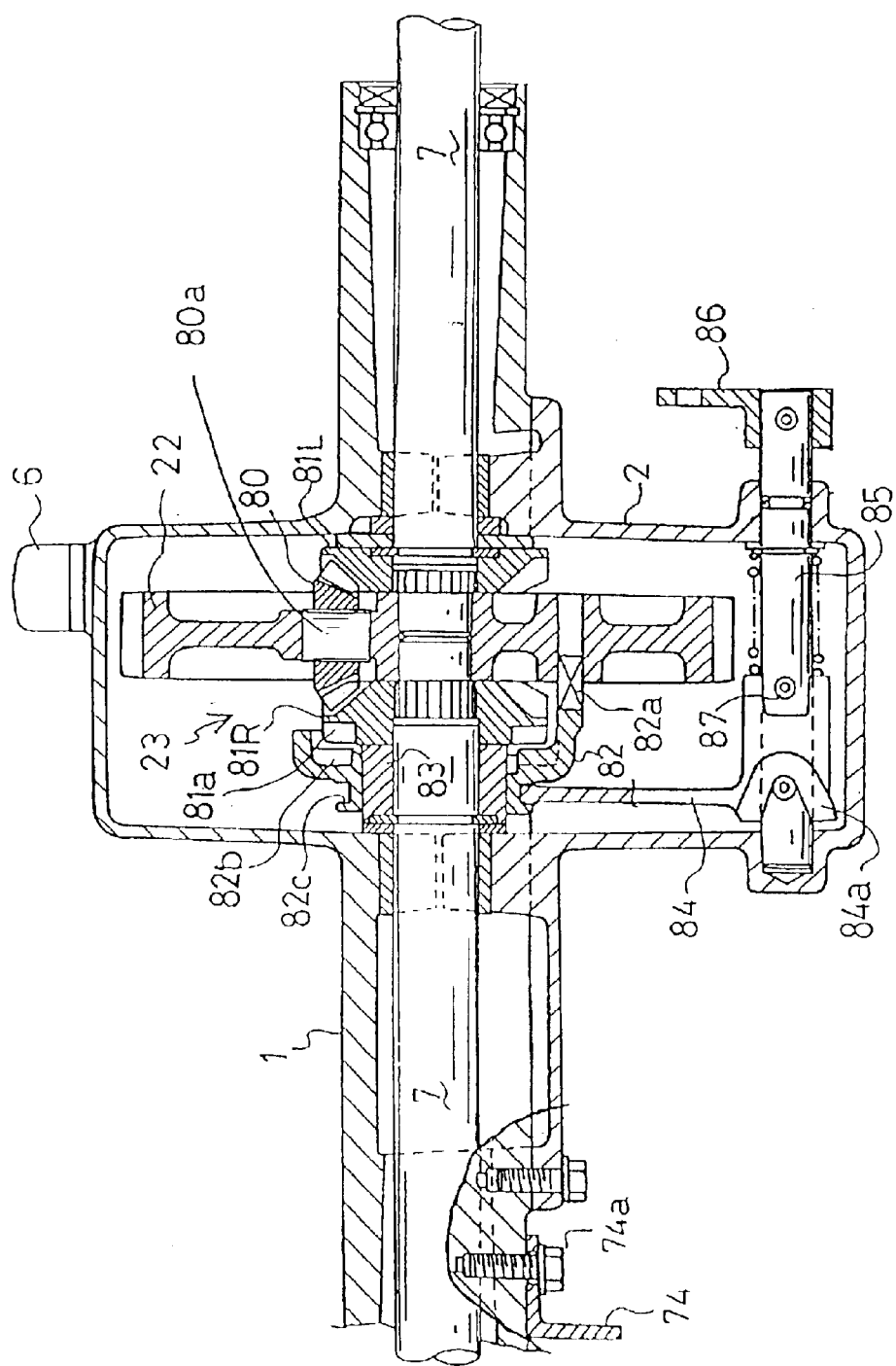
FIG. 22 is sectional view of a differential gear and a differential locking device.
Figure 23:
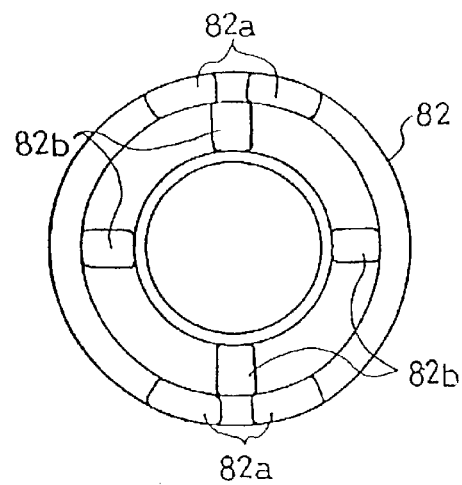
FIG. 23 is a side view of a slider of the differential locking device.

As best seen in FIGS. 2 and 22, the distal ends of axles 7 are rotatably supported by ball bearings in axle housing portions projecting from upper half housing 1. The proximate end of each axles 7 is sleeved by a bearing bush. One half of each bearing bush is received in a recess in upper half housing 1. The other half is received by a projection of lower half housing 2 which enters into upper half housing 1. Axles 7 are rotatably supported to receive power transmitted through differential gear 23. As shown in FIG. 2, the HST is disposed to the right side of the drive train. A control arm 38 for movable swash plate 11 is disposed to the right side of the HST. Hydraulic pump P is positioned substantially at the lateral and longitudinal center of the apparatus and is disposed so as to avoid the enlarged portion of differential gear 23. This enables the housing to be compact.

Figure 24:
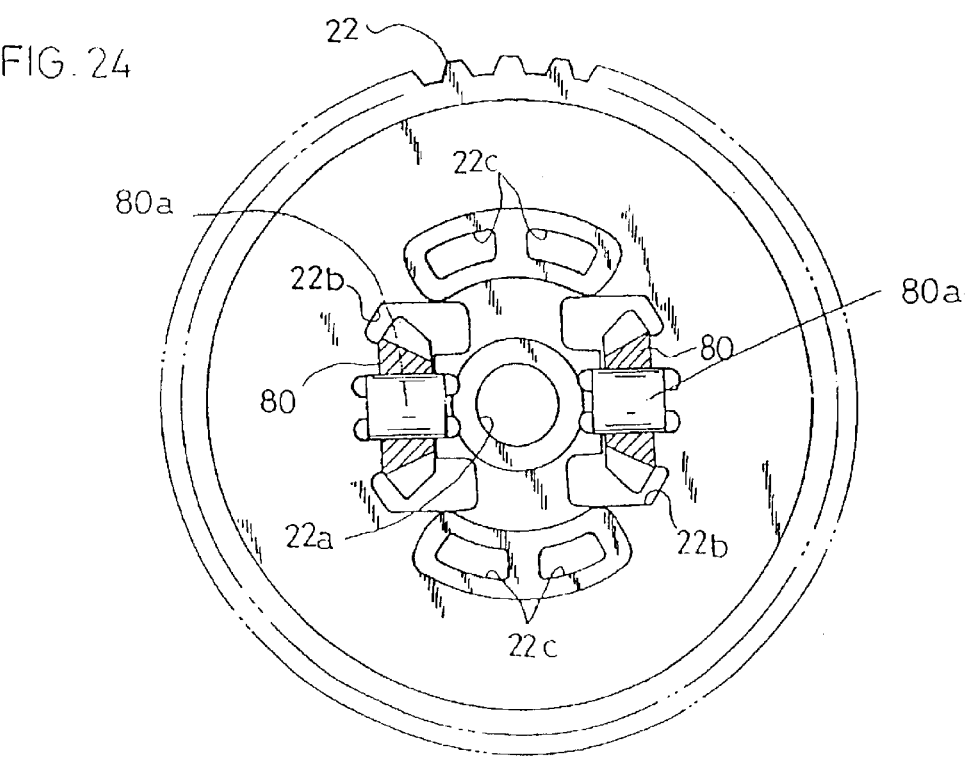
FIG. 24 is a side view of a ring gear of the same.
Figure 25:
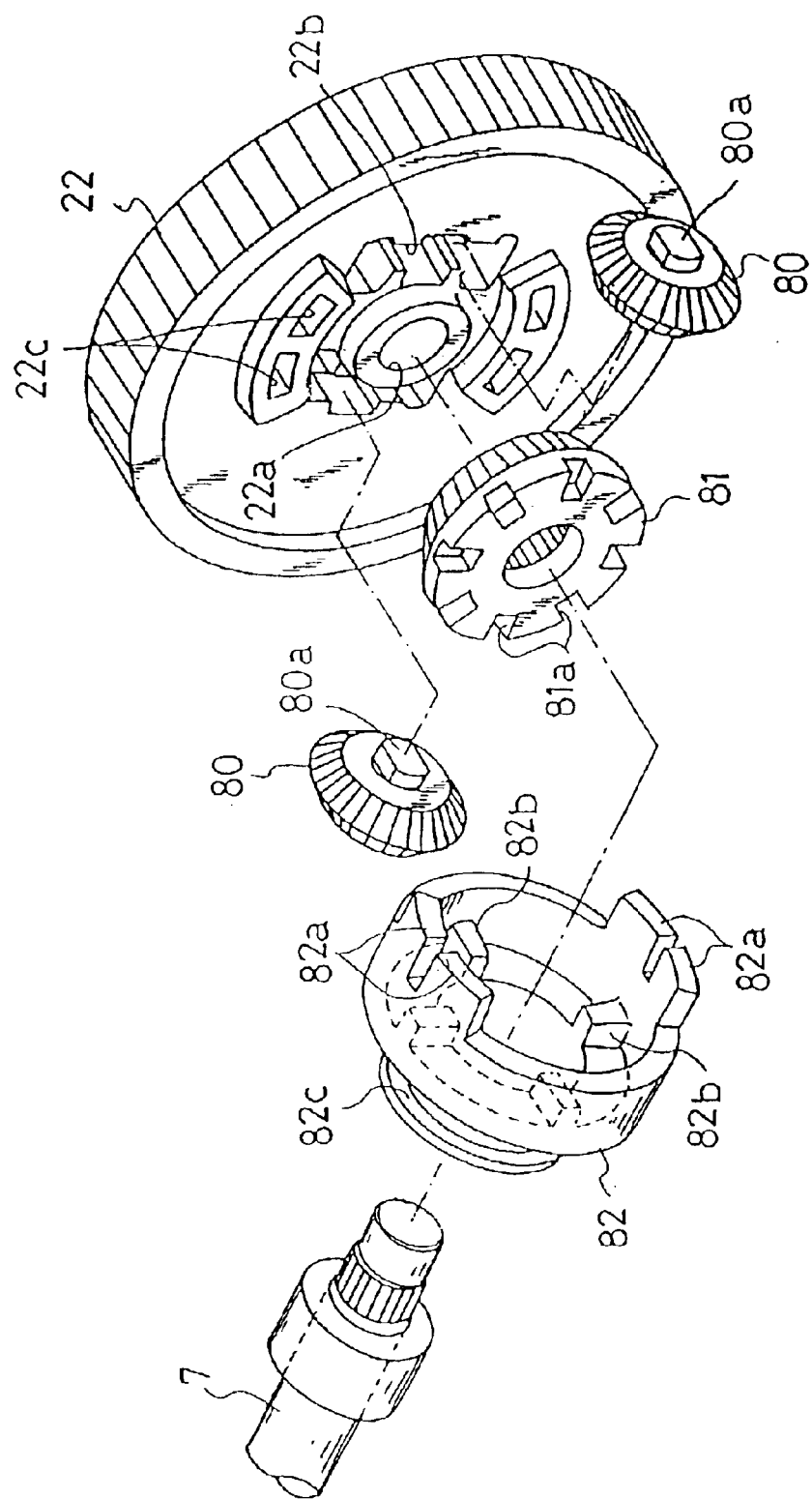
FIG. 25 is a perspective exploded view of the differential gear of the present invention.

Differential gear unit 23 is shown in FIGS. 22 through 25. As seen in FIG. 24, the center of input gear 22 has a shaft bore 22a for receiving axles 7 therein. Bores 22b for receiving differential pinions 80 and fitting-in bores 22a for receiving the differential locking device are disposed at both sides of input gear 22. Spline-fitted bevel-type output gears 81L and 81R are disposed at the proximate end of axles 7. Spindles 80a of the bevel-type differential pinions 80 are retained in bores 22b of input gear 22 in which differential pinions 80 are also housed. Differential pinions 80 engage with output gears 81L and 81R so as to form differential gear unit 23. No differential casing is otherwise provided. The differential locking device is provided opposite to the drive train at one side (preferably the right side) of differential gear 23 unit.

Between output gear 81R and the proximate end of right axle 7 is interposed a collar 83 on which a slider 82 is axially slidably fitted. Slider 82 is cup-like shaped to wrap around output gear 81R. At the outer peripheral side surface of slider 82, projections 82a are integrally provided. Projections 82a are permanently engageable with insertion bores 22c of input gear 22. At the inner peripheral side surface of slider 82 are formed a plurality of projections 82b which are engageable with a plurality of recesses 81a formed in the outer periphery of output gear 81R. An insertion groove 82c is formed on the cylindrical portion of slider 82 opposite to projections 82a, so as to fit the tip of a fork 84 into groove 82. The base of fork 84 is slidably fitted onto a shaft 85 which is journalled to both side walls in lower half housing 2. At the side surface of the base of fork 84 is formed a cam surface 84a, which abuts against a pin 87 provided on shaft 85 so as to constitute a cam mechanism. An arm 86 is fixed to shaft 85. Arm 86 projects outwardly from the housing so as to connect with a differential locking pedal (not shown) provided on the vehicle.

In such construction, when the operator presses the differential locking pedal, shaft 85 rotates through arm 86, and pin 87 rotates to push to the right in the drawing of FIG. 22. As a result, cam surface 84*a* abuts against pin 87 so as to slidably move fork 84. At the same time, slider 82 slides, while maintaining projections 82*a* in insertion bores 22*c* of ring gear 22. Projections 82*b* engage with recesses 81*a* of output gear 81R and input gear 22 is differentially locked and coupled with axles 7. As a result, axles 7 are uniformly driven when the vehicle runs on any road surface.

The axle driving apparatus of the present invention can be used for driving the axles of a vehicle to improve the operability of changing the speed of the vehicle. An example of a moving vehicle which may utilize the above-mentioned axle driving apparatus is a farm or other working vehicle, such as a tractor with a mower attachment, or other vehicle for transportation.

While one embodiment of the present invention has been shown and described, the invention should not be limited to the specific construction thereof, and is meant to be merely exemplary.

What is claimed is:

1. An axle driving apparatus for a vehicle comprising:

a hydrostatic transmission including an input means, a hydraulic pump driven by said input means, a hydraulic motor driven by pressurized oil from said hydraulic pump, and an output means driven by said hydraulic motor;

an axle;

a drive train for connecting in a driving manner said output means of said hydrostatic transmission with said axle, wherein said output means, said drive train and said axle have respective rotary axes in parallel to one another; and a housing containing said hydrostatic transmission, said axle, and said drive train, said housing being dividable into a first housing member and a second housing member, wherein an open surface defining a plane is formed in each of said first and second housing members, and said open surface is larger than the greatest diameter of a movable swash plate in rotation;

wherein said hydraulic pump is provided with a cylinder block, containing a plurality of reciprocally movable pistons and having a rotary axis substantially perpendicular to said rotary axis of said axle, said movable swash plate for receiving thrust from the heads of such pistons, and a means for slantingly rotatably supporting said movable swash plate in said housing;

wherein said means for slantingly rotatably supporting said movable swash plate includes a first trunnion and a second trunnion provided coaxially at respective opposite sides of said movable swash plate in substantially parallel to said axle, said first trunnion is rotatably supported by said first housing member and is extended outwardly from said first housing member to be fixed on an arm linked with a speed changing member equipped on said vehicle, and said second trunnion is rotatably supported by said second housing member; and wherein a biasing mechanism, which automatically returns said movable swash plate to the neutral position when said arm is released from an operational force, is interposed either between said first trunnion and said first housing member or between said second trunnion and said second housing member.

2. The axle driving apparatus as set forth in claim 1, wherein said housing contains said biasing mechanism.

3. The axle driving apparatus as set forth in claim 1,2 wherein said biasing mechanism includes a coiled spring wound around either said first or second trunnion.

* * * * *

UNITED STATES PATENT AND TRADEMARK OFFICE
CERTIFICATE OF CORRECTION

PATENT NO. : 6,786,042 B2
DATED : September 7, 2004
INVENTOR(S) : Norihiro Ishii It is certified that error appears in the above-identified patent and that said Letters Patent is hereby corrected as shown below:

Column 12,
Line 33, "claim 1,2" should be -- claim 1 --.

Signed and Sealed this

Thirty-first Day of May, 2005

JON W. DUDAS
*Director of the United States Patent and Trademark Office*